UNITED STATES PATENT OFFICE.

FRIEDRICH WILHELM WEBER, OF PERTH AMBOY, NEW JERSEY, ASSIGNOR TO THE ROESSLER & HASSLACHER CHEMICAL CO., OF NEW YORK, N. Y., A CORPORATION OF NEW YORK.

STABLE COMPOUNDS CONTAINING HYDROGEN PEROXID AND PROCESS OF MAKING THE SAME.

1,153,985.      Specification of Letters Patent.      Patented Sept. 21, 1915.

No Drawing.      Application filed December 9, 1913. Serial No. 805,523.

*To all whom it may concern:*

Be it known that I, FRIEDRICH WILHELM WEBER, a subject of the Emperor of Germany, and a resident of Perth Amboy, county of Middlesex, and State of New Jersey, have invented certain new and useful Improvements in Stable Compounds Containing Hydrogen Peroxid and Processes of Making the Same, of which the following is a specification.

This invention relates to a stable compound containing hydrogen peroxid and it particularly refers to solid compounds obtained by combining hydrogen peroxid with substances containing one or more amido groups, in the presence of a suitable stabilizing agent.

Heretofore various efforts have been made to prepare a stable compound consisting of urea and hydrogen peroxid, but none of them have yet proved successful in producing a marketable product of lasting stability. In my researches on manufacturing such stable compounds, I have discovered that hydrogen peroxid may be combined with urea or other compounds, containing one or more amido groups, to form a solid compound of most satisfactory stability, preferably by effecting the combination in a solution containing a suitable stabilizing agent. Such a stabilizing agent, I have found, may be a slimy, gelatinous or mucilagenous solution such as a solution of carrageen moss, obtained by boiling either *Chondrus crispus* or *Gigartina mamillosa* in water, and by using the same for the purpose in view I obtain products which satisfy all the commercial requirements.

The mother liquors resulting from my new process are also stable and practically no loss of oxygen occurs upon standing for a considerable time; they may be used over again in the process or may be evaporated, as circumstances may require.

The following example serves to further elucidate my process: Into 200 cc. of a 3% aqueous solution of carrageen are introduced 30 gr. urea; the mixture is evaporated on a water bath, and the dry residue disintegrated into a fine powder; the latter is then added to 58 gr. of a 30% solution of hydrogen peroxid, cooled by ice, while the mass is gently stirred. After the mass has been allowed to stand for about 30 minutes, the solid crystalline substance is quickly separated, as by filtration, from the mother lye. The obtained crystals are dried by any of the well known methods, and show usually an average of 35% $H_2O_2$.

It is evident that traces of the extract from the carrageen moss may adhere to and probably form a fine protective coat for the dry compound, comprising or consisting of urea and hydrogen peroxid, inasmuch as it is not necessary to treat the crystals with any washing fluid on separating the same from the mother liquor. The action of the solution of carrageen moss is independent of its own strength, and it is furthermore effective for aqueous solutions of hydrogen peroxid of any concentration.

I do not restrict myself in the operation of my invention to the use of urea alone as the compound containing the amido group, inasmuch as the combination of hydrogen peroxid with other substances containing one or two amido groups, as for instance the derivatives of urea, thiocarbamid and its derivatives, hexamethylenetetra-amin, hydrazin, etc., is governed as well by the protective influence of the carrageen moss solution and correspondingly produces stable compounds containing an increased amount of hydrogen peroxid. It is therefore obvious that I do not restrict myself either to the ingredients named or to the proportions thereof given further than the scope of the appended claims demands.

What I claim and desire to secure by Letters Patent is:

1. The process of manufacturing stable compounds containing hydrogen peroxid, consisting in combining hydrogen peroxid with a substance containing one or more amido groups in the presence of a gelatinous stabilizing agent.

2. The process of manufacturing stable compounds containing hydrogen peroxid, consisting in combining hydrogen peroxid with a substance containing one or more amido groups in the presence of an extract of carrageen moss.

3. The process of manufacturing a stable compound containing hydrogen peroxid, consisting in combining hydrogen peroxid with urea in the presence of an extract of carrageen moss.

4. As an article of manufacture a solid, stable compound comprising hydrogen peroxid and a substance containing one or more amido groups, protected by a fine coat of a gelatinous stabilizing agent.

5. As an article of manufacture a solid, stable compound comprising hydrogen peroxid and a substance containing one or more amido groups, protected by a fine coat carrageen moss.

6. As an article of manufacture a solid, stable compound consisting of hydrogen peroxid and urea protected by a fine coat of carrageen moss.

In testimony whereof I have signed this specification in the presence of two subscribing witnesses.

FRIEDRICH WILHELM WEBER.

Witnesses:
JOSEPH A. BRIANEAR,
OTTO K. ZWINGENBERGER.